United States Patent [19]

Loveless et al.

[11] 4,260,035
[45] Apr. 7, 1981

[54] CHIN CONTROLLER SYSTEM FOR POWERED WHEELCHAIR

[75] Inventors: John H. Loveless, Westminster; Woodrow Seamone, Rockville, both of Md.

[73] Assignee: The Johns Hopkins University, Baltimore, Md.

[21] Appl. No.: 60,856

[22] Filed: Jul. 26, 1979

[51] Int. Cl.³ .............................................. B62D 11/04
[52] U.S. Cl. .............................. 180/6.5; 180/DIG. 3; 200/DIG. 2
[58] Field of Search ................ 180/6.5, DIG. 3, 77 R; 200/DIG. 2, 52 R; 3/1.1; 128/782; 340/407

[56] References Cited

U.S. PATENT DOCUMENTS

| | | | |
|---|---|---|---|
| 3,934,181 | 1/1976 | Rosenthal | 180/6.5 |
| 3,993,154 | 11/1976 | Simmons et al. | 180/DIG. 3 |
| 4,059,786 | 11/1977 | Jones et al | 180/DIG. 3 |
| 4,078,627 | 3/1978 | Brown et al. | 180/DIG. 3 |

FOREIGN PATENT DOCUMENTS 1245922  9/1971  United Kingdom .............. 180/DIG. 3

*Primary Examiner*—John A. Pekar
*Attorney, Agent, or Firm*—Robert E. Archibald

[57] ABSTRACT

An improved chin controller system, for controlling a motor-driven wheelchair or the like, comprises an elongated control arm which extends unobtrusively to a location adjacent to occupant's chin and there supports an actuator mechanism, designed with very low profile to present minimum obstruction in front of the user-patient's face. The controller unit is designed so that when not in use, the user may readily move the controller to one side. The actuator carried on the control arm is engageable by the underside of the user's chin and may be moved vertically (depressed) to provide proportional speed control of the wheelchair, and laterally (from side-to-side) in a horizontal plane, to provide proportional left/right steering control. The actuator also comprises means enabling the user to select the desired forward or reverse direction of travel for the wheelchair and also to select between different drive torque levels for the drive motors. Control circuitry responds to the movement of the control arm and develops proportionate speed/steering control voltage signals which are processed and interfaced to the drive motors of commercially available powered wheelchair units to control the wheelchair in accordance with the command chin movements of the patient. The proportionate speed/steering command movements of the chin-operated control arm are sensed either optically or by potentiometers mechanically linked to the control arm movements; whereas, the simple two-state switching functions are sensed by microswitches or the like responsive to control arm movement/user actuation. The electronic control circuitry of the chin-operator control system includes suitable interlock provision so that forward/reverse direction selection can be altered only when the wheelchair is at rest and, moreover, the wheelchair steering control is correlated with speed control in order to affectuate smooth turning of the wheelchair.

29 Claims, 16 Drawing Figures

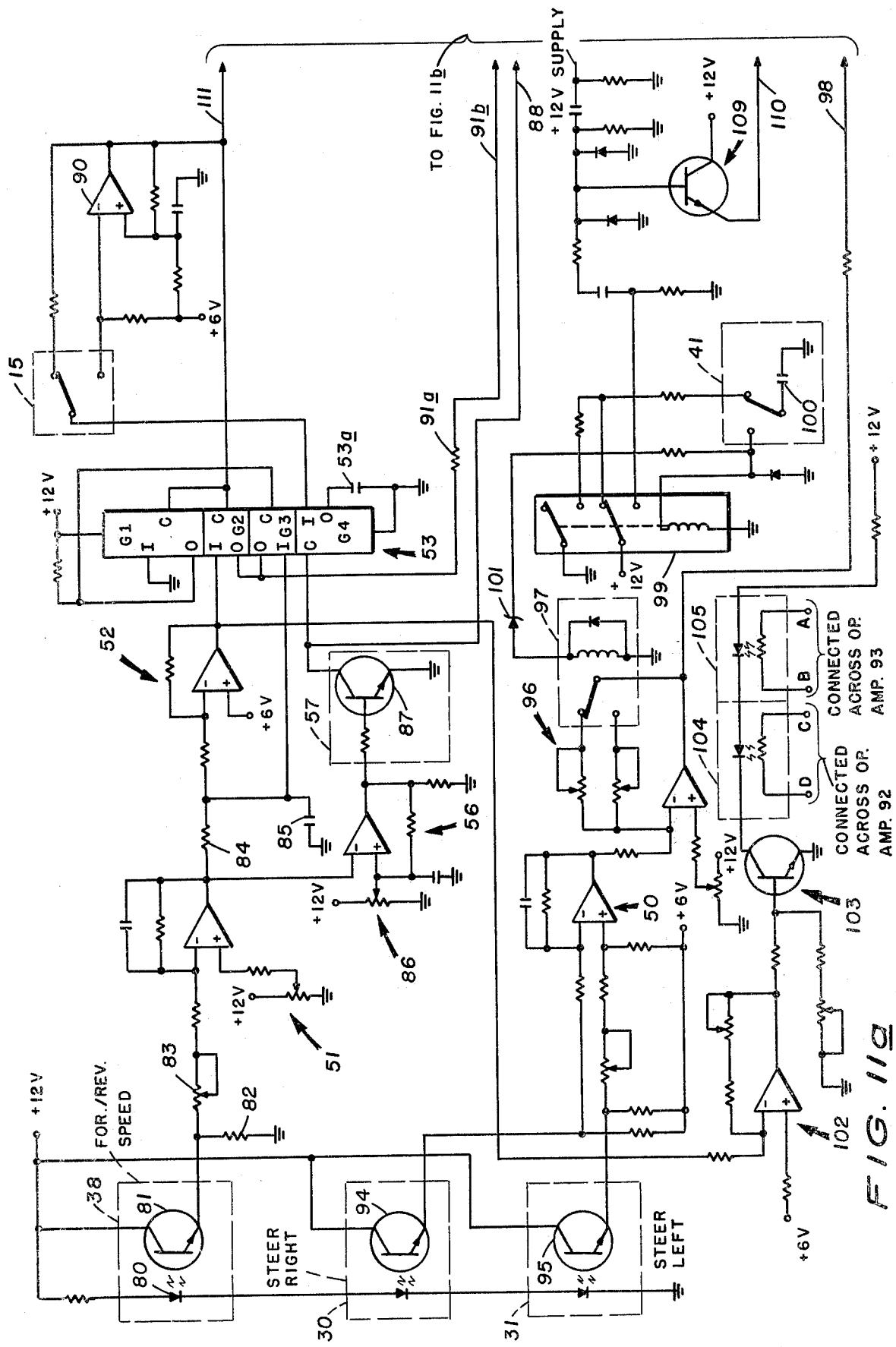

CHIN CONTROLLER SYSTEM FOR POWERED WHEELCHAIR

STATEMENT OF GOVERNMENT INTEREST

The invention herein described was made in the course of or under a contract or subcontract thereunder, with the Department of the Navy.

BACKGROUND OF THE INVENTION

Quadraplegic persons, such as those suffering from high spinal chord injury, are often able to operate a powered wheelchair, if the wheelchair is equipped with a chin controller system, whereby the occupant controls or commands desired operation of the wheelchair by means of slight chin movements. A state-of-the-art or conventional chin controller comprises essentially a joystick whose end is equipped with an enlarged rubber cup, designed to fit over and engage the patient's chin. The joystick is then moved relative to its central position by the patient's chin movements, e.g. forward and back in order to select forward and reverse directions of travel respectively, with speed dependent upon the amount of displacement of the joystick from its central position, and proportionate steering control being accomplished by chin movement of the joystick to the left or right of center. This conventional joystick-type chin controller is rather bulky in design, however, and is objectionable for some users in that it remains positioned in front of the user's face until removed by an attendant.

DESCRIPTION OF THE INVENTION

In view of the current state of the art pertaining to chin controllers for powered wheelchairs, the need exists generally for an improved chin controller, designed with a low profile so as to minimize the obstruction in front of the user's face during operation and which is preferably designed so that when not in use the wheelchair occupant may readily move the controller apparatus to one side by means of a simple chin movement. This permits the user to use a tool like a mouthstick without interference with the controller. In addition, need exists for improving the chin controller operation so as to simplify the chin movements required to properly operate the wheelchair controller; e.g. by making the apparatus more responsive and more accurate in sensing chin movement, by separating the forward/reverse direction of travel selection from the speed and steering control movements, by control system filtering to minimize head bobbing effects, and by improving the control signal processing/interfacing circuitry which operably connects the chin-operated apparatus to the wheelchair drive motor circuits.

One object of the present invention, therefore, is to provide an improved, low profile chin controller suitable for use on a powered wheelchair or the like and responsive to chin movements of the user/occupant.

A further object of the present invention is to provide an improved chin controller, for a powered wheelchair, which permits the user to select between forward and reverse directions of travel, and to accomplish proportional speed and steering control, through simple associated chin movements.

A further object of the present invention is to provide a chin controller structure comprising a pre-shaped control arm which is engageable with and operable by the user's chin, with minimized obstruction in front of the user's face, and which control arm extends to the rear of the wheelchair where it is mounted for pivotal movement about two orthogonal axes in response to the control or command movements of the user's chin, in both the vertical (speed) and lateral (steering) control directions, with means for sensing pivotal movement of the control arm about said axes in order to develop corresponding control signals that are processed to control operation of the wheelchair drive motors in accordance with the user's chin (command) movements.

A further object of the present invention is to provide an improved control system for a powered wheelchair, including provision for safely changing direction of travel and provision for correlating the steering and speed controls in order to improve the smooth turning of the wheelchair when in motion, in addition to control system filtering to minimize high frequency head motion.

A further object of the present invention is to provide an improved chin controller system and apparatus fully compatible with commercially available powered wheelchairs.

Other objects, purposes and characteristic features of the present invention will in part be pointed out as the description of the present invention progresses and in part be obvious from the accompanying drawings, wherein.

Figure 11B:
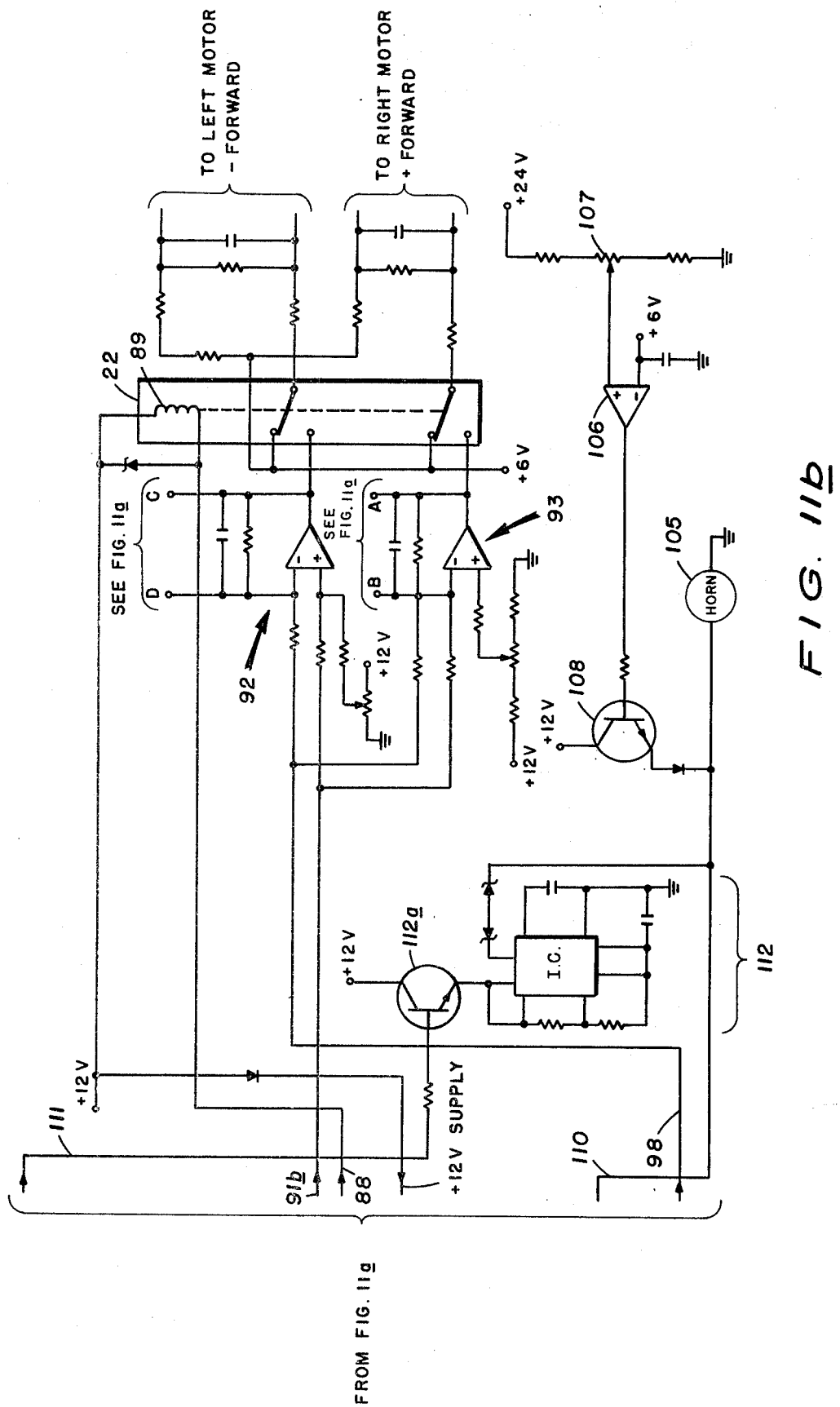
Figure 12:
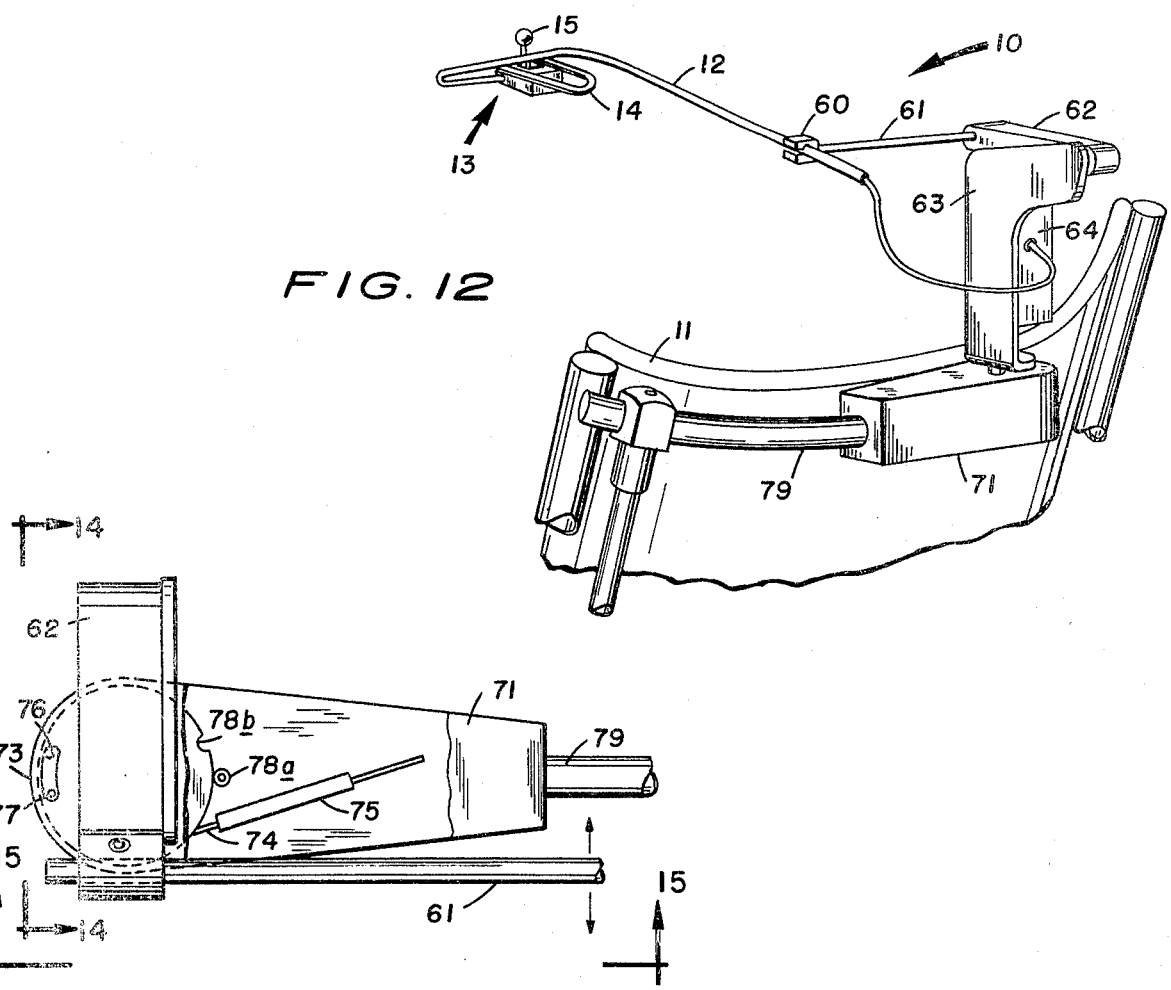
Figure 13:
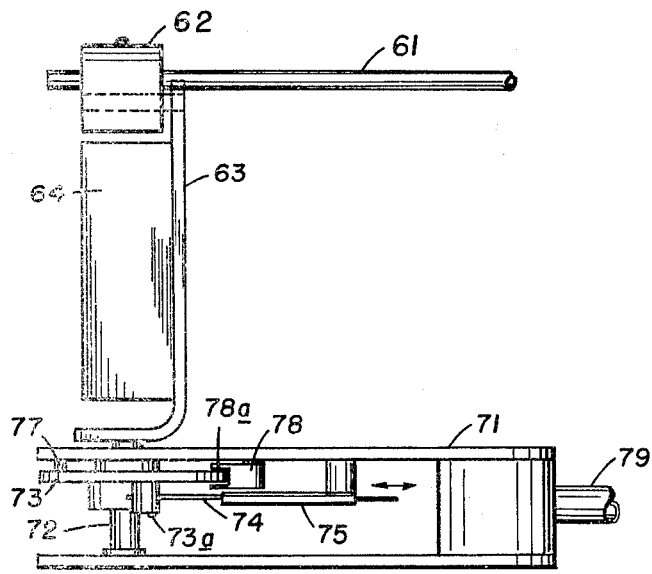
Figures 14, 15:
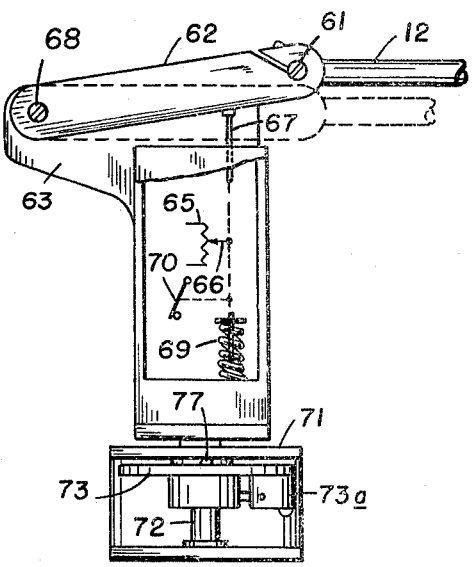

FIGS. 11a and 11b, when placed side-by-side, form a schematic drawing of the control circuitry for converting the optically sensed command chin movements into corresponding control voltage signals and interfacing them as control inputs to the drive motors of a conventional powered wheelchair;

FIG. 12 is a prospective view of a second embodiment of the chin controller mechanism of the present invention, whereby movements of the chin-operated control arm are sensed with mechanically-connected potentiometers that convert the control movements into control voltage signals;

FIG. 13 is a partial top plane view of the second embodiment shown in FIG. 12;

FIG. 14 is a side view of the second embodiment, taken along line 14—14 in FIG. 13; and FIG. 15 is a partial front view of the second embodiment, taken along line 15—15 in FIG. 13.

Quadriplegic persons, including those suffering high spinal cord injury, are often capable of utilizing motor-driven or powered wheelchairs, such as those manufactured by Everest and Jennings, Inc. (current model 3P). To facilitate user control of steering and speed, such powered wheelchair can be equipped, in accordance with the present invention, with an improved chin controller system having low-profile mechanical design and improved electronic control circuitry which converts the user's chin movements into corresponding control voltage signals and interfaces them with the drive motor circuits of the powered wheelchair.

Figure 1:
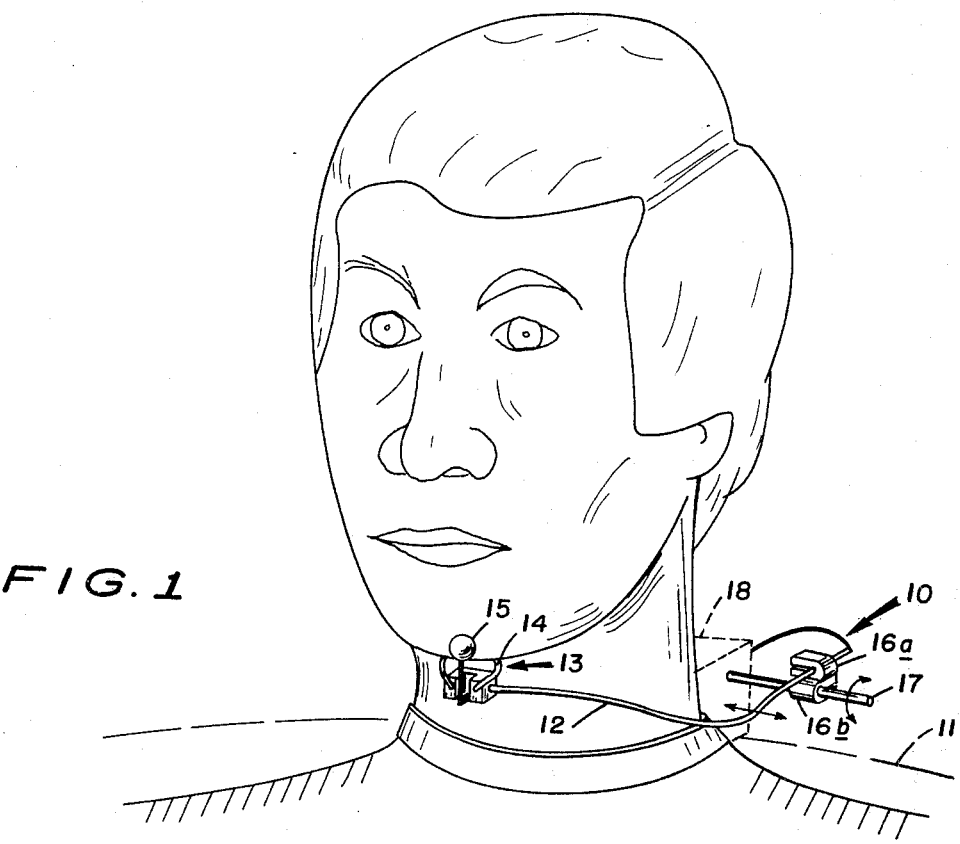
FIG. 1 is a partial side view diagrammatically illustrating a wheelchair equipped with the improved chin controller proposed in accordance with the present invention.
Figure 2:
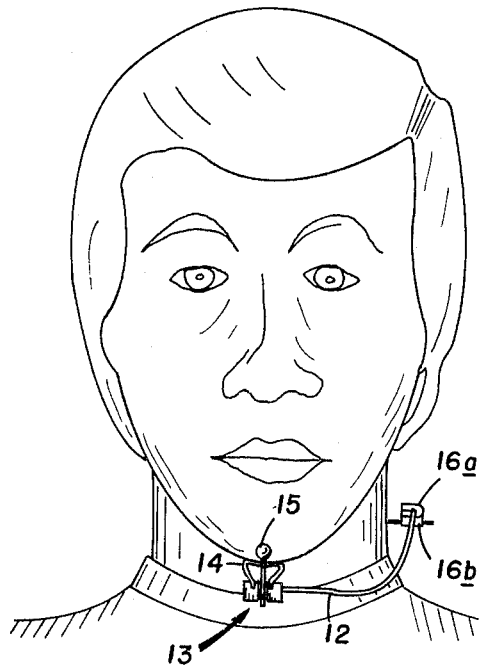
FIG. 2 is front view illustrating the minimal obstruction presented by the proposed chin controller.

Referring now to FIG. 1 of the drawings, the improved low-profile chin controller unit is generally represented at 10 and is mounted to the rear of the wheelchair 11, so that a minimal structure is visible from front of the user/occupant. As shown, the proposed chin controller 10 includes a pre-shaped, thin control arm 12 which extends from the rear of the wheelchair 11 to a point adjacent the user's chin and supports there an actuator mechanism 13 comprising a U-shaped member 14 which extends under the user's chin; whereby the user can depress the control arm 12 and simultaneously, if desired, move the control arm 12 laterally; i.e. left to right. The mechanism 13 also contains the microswitch actuator 15 which extends upwardly into position where it may be readily operated by a slight forward movement or nudge of the user's chin. As indicated in FIG. 1, the rearwardly extending end of the control arm 12 is affixed by clamps 16a and 16b to a rod 17 which extends from control box 18 that is mounted to the rear of the wheelchair 11, in any suitable manner. The control lever 12 is movable, by the patient laterally from side to side (to swing or pivot the rod 17 in a horizontal plane for steering control) and vertically up and down (to rotate the rod 17 about its longitudinal axis for proportionate speed control), all of which will be described in more detail hereinafter. As illustrated most clearly in FIG. 2 of the drawings, the mechanical configuration of the proposed chin controller is low-profile and presents minimal obstruction in front of the user's face during operation. This represents a significant improvement over the currently used joystick chin controller having an enlarged rubber cup which fits over the user's chin and which remains there (to constitute an obstruction to eating, conversing, etc.) until it is removed to one side by an attendant or by means of a user-actuated motorized controller. On the other hand, the proposed chin controller structure is designed so that when not in use, the user, without assistance, may readily move the chin controller mechanism to one side.

Figure 3:
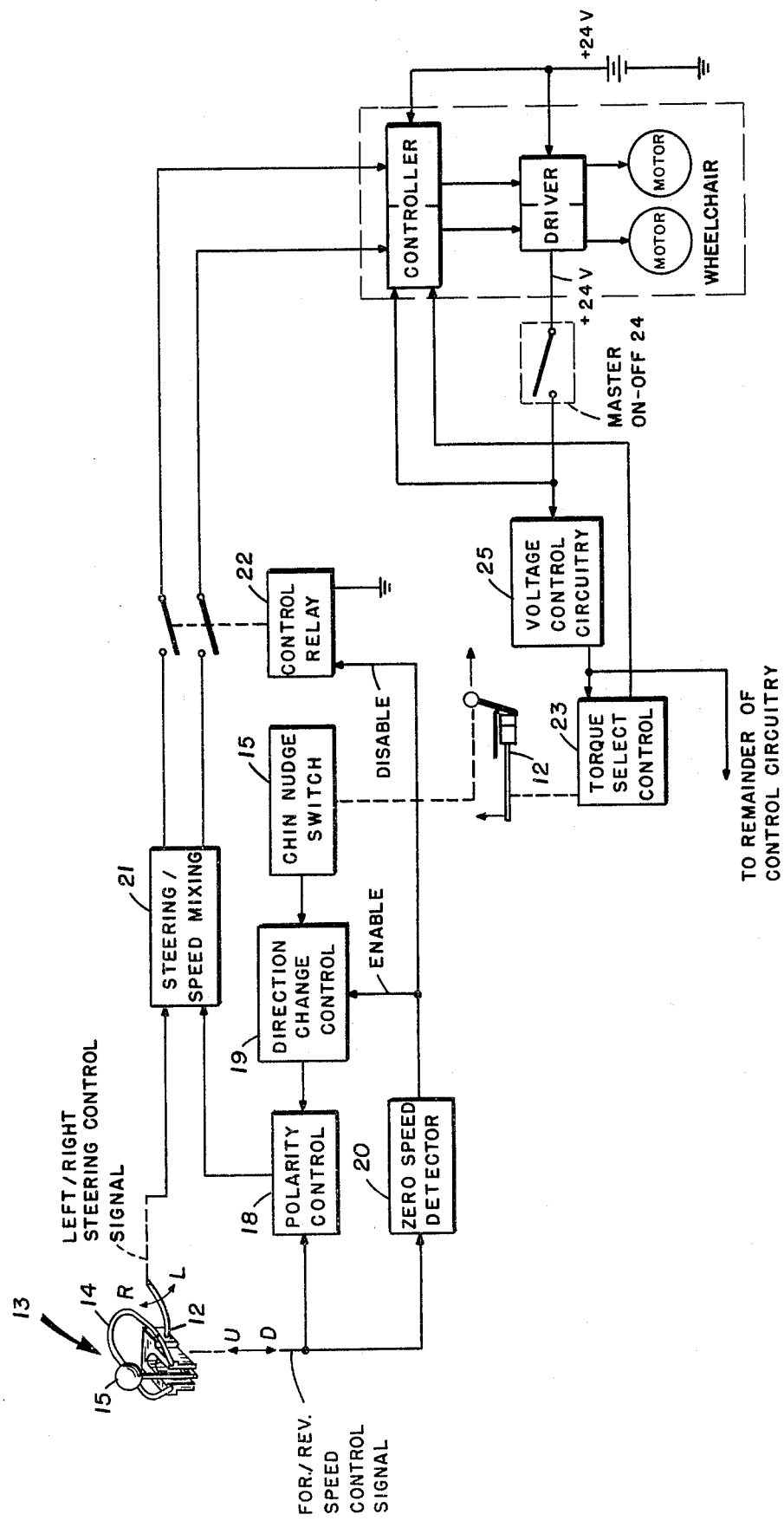
FIG. 3 is a block diagram of the chin controller system provided in accordance with the present invention for controlling the operation of a conventional powered wheelchair.

In order to better understand the operation of and control provided by the proposed chin controller system and apparatus of the present invention, reference is made to the block diagram shown in FIG. 3. As indicated therein, left and right (i.e. lateral) movement of the user's chin moves the control arm 12 and, as a result, generates a proportionate steering control signal; whereas, vertical movement (e.g. depression) of the control arm 12 produces a corresponding and proportionate speed control signal.

Functionally, the proposed chin controller system of the present invention includes polarity control circuitry 18 which responds to the speed control signal and sets its polarity in accordance with the direction of travel of the wheelchair (forward or reverse) desired by the user. As mentioned hereinabove, the user may select forward or reverse direction of travel by moving his chin forward slightly to actuate the microswitch 15 disposed on the actuator mechanism 13, as illustrated in FIG. 3; i.e. this chin nudge switch 15 is effective to operate direction change control 19 (FIG. 3) which determines the polarity of the speed control voltages applied to the drive motors of the wheelchair and thus their direction of rotation. In accordance with the present invention, a zero speed detector 20 senses the vertical position of the control arm 12 and performs an interlocking function which permits (enables) a direction change to be affected only when the control 12 is in its upper at rest (zero speed) position.

The proposed chin controller system also includes circuitry 21 which operates to electronically combine or mix the steering and speed control voltage signals in such a manner that the speed control voltages applied to the drive motors are correlated with the steering command voltages, e.g. so as to prevent high speed operation at the same time that the user is commanding a relatively sharp turn. As shown in FIG. 3, the proposed control circuitry applies the steering/speed command voltage signals to the wheelchair (assumed conventional and enclosed in the dash line) only when the chin control arm 12 is depressed by the user (to command a non-zero speed) through the use of control relay 22 whose contacts are connected in series in the steering/speed control voltage input circuits to the wheelchair. This enables the user to move the control arm 12 to one side, without actuating the drive motors, so long as it is in its upper zero speed position and thereby completely remove the control arm 12—actuator 13 from in front of the patient's face when the chin controller is not being used. Moreover, the proposed chin controller system also includes a torque select control circuit 23 which is rendered effective, for example, when the user lifts up on the control arm 12 by exerting an upward force on U-shaped member 14) to change the torque level for the wheelchair drive (e.g. when climbing a hill).

A master on-off switch 24 is connected between the usual 24 VDC power supply and the control circuitry provided by the present invention. The switch 24 would be operated to initially activate the proposed controller system, under the control by an attendant or the user himself, and is effective to apply battery supply voltage to the controller portion of the conventional wheelchair and simultaneously to suitable voltage control circuitry 25 which, in turn, furnishes the operating voltage levels to the remainder of the control circuitry portion of the present invention.

Figure 5:
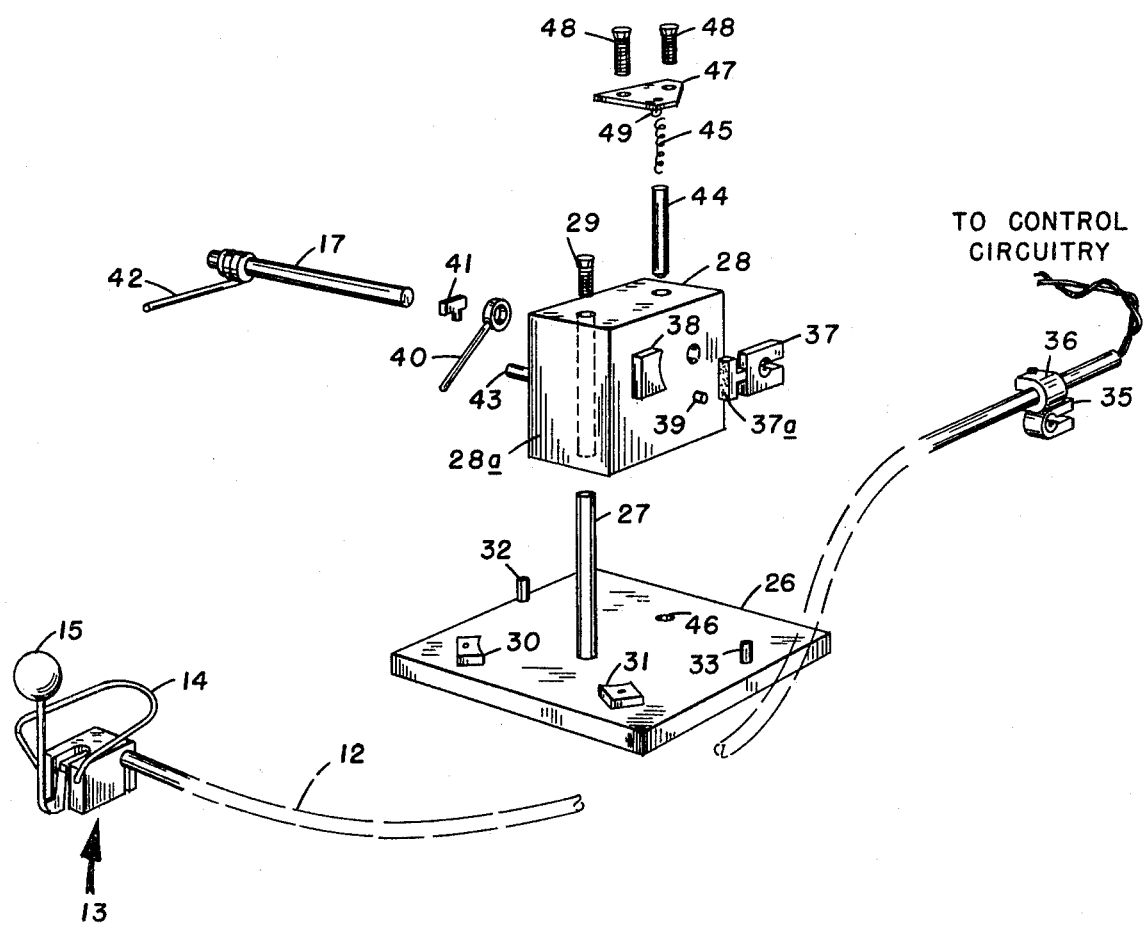
FIG. 5 is a disassembled view of the preferred embodiment of the chin controller mechanism, proposed in accordance with the present invention, whereby command chin movements are detected optically.

The mechanical configuration of the preferred embodiment is illustrated in FIG. 5 of the drawings and employs optical sensing of the position of the chin-operated control arm 12. More particularly, base plate 26 supports a vertical shaft 27 extending upwardly therefrom to receive a gimbal reflector block 28 for pivotal motion about the shaft 27; the block 28 being secured for such motion by screw 29. The side surfaces of the rectangular block 28 are polished or otherwise made light reflective, whereas the front face or surface 28a is coated with a suitable black masking material which is optically non-reflective.

A pair of optical source sensor units 30 and 31 are secured to the base plate 26 and are positioned slightly in front of the front surface 28a of block 28, so that the angular position of the block 28 is detectable by sensing the amount of light reflected from the light source in each unit 30-31 to the light sensor in that unit. In one practical application of the present invention, the source/sensor units 30 and 31 each contained a GaAs light emitting diode and a silicon NPN phototransistor in a hermetically sealed, glassed lens package, such as those manufactured by Spectronics, Inc. Dowel pins 32 and 33 are disposed on either side of the base plate 26 to define the limits for pivotal motion of the reflector block 28 about the shaft 27 (see also FIGS. 7 and 8).

Figure 6:
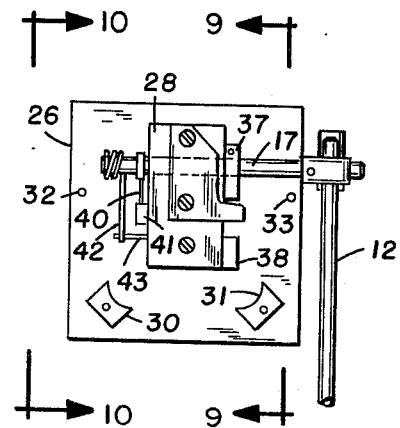
FIGS. 6, 7 and 8 are top plan views of the chin controller mechanism shown in FIG. 5, illustrating different operating positions of the mechanism.

Horizontal shaft 17 extends through the block 28 and receives a clamp 35 at its extending right-hand end in FIG. 5. This clamp 35, in turn, is affixed to a perpendicularly disposed clamp 36 which receives the rearwardly extending end of the control arm 12, such that vertical movement of the control arm 12 (when the patient depresses the U-shaped chin engaging member 14) causes the rod 17 to rotate about its longitudinal axis. Similarly, when the control arm 12 is moved laterally the user (e.g. in order to affect steering control), the force exerted on the control arm 12 is transferred to rod 17 and causes the reflector block 28 to pivot on the axis defined by the shaft 27 (see FIGS. 6, 7 and 8).

Secured to the horizontal rod 17 is a block member 37 whose front surface 37a is optically reflective. The angular position of the shaft reflector block 37 is detected by means of an optical source/sensor unit 38 secured to the right-hand side of gimbal reflector block 28. Thus, the output of the optical unit 38 varies in accordance with the vertical position of the control arm; i.e. the command speed level desired by the user. A dowel pin 39 fixes the lower operating limit for the shaft reflector block 37.

Figure 10:
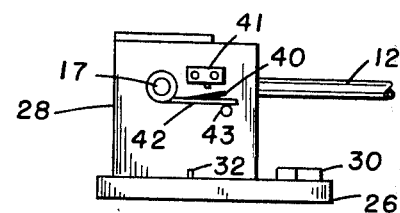
FIG. 10 is a side view of the chin control mechanism taken along line 10—10 in FIG. 6.

Connected to the shaft 17 on the opposite or left-hand side of the gimbal reflector block 28 is a switch actuator arm 40 which cooperates with a microswitch 41, attached to the left-hand surface of the block 28 (see FIG. 10). The microswitch 41 is thus activated when the user raises the control arm 12 from its normal at rest position to a slightly higher position, and thereby switches between the two different driving torque levels provided in accordance with the present invention.

The shaft 17 also carries a torsion spring member 42 (at its left-hand end) which extends towards and engages with a dowel pin 43 (see FIG. 10), in order to assert a continual biasing force on the shaft 17 which urges the control arm 12 into its at rest or zero speed position.

The gimbal block 28 also has a vertical bore extending therethrough to receive a detent pin 44 which is spring-biased, by spring 45, into engagement with the upper surface of the baseplate 26 where it engages in a slight concave recess 46 to index the control arm 12 at its center (straight ahead) steering position. The spring 45 is held within the block 28 by a cover plate 47 that is secured, by screws 48, onto the top of the block 28. Affixed to the underside of the cover plate 47 and extending so that it may be engaged by the shaft reflector block 37 is an upper limit stop member 49 (preferably adjustable).

As previously noted, the amount of light received by the sensors of the optical units 30 and 31 is dependent upon the angular position of the gimbal reflector block 28 about the pivot shaft 27, as the control arm 12 is moved laterally by the user to command the desired steering direction for the powered wheelchair. Similarly, the amount of light received by the sensor portion of the optical unit 38 is proportional to how much the control arm 12 is depressed by the patient; i.e., the desired speed for the wheelchair.

Figure 4:
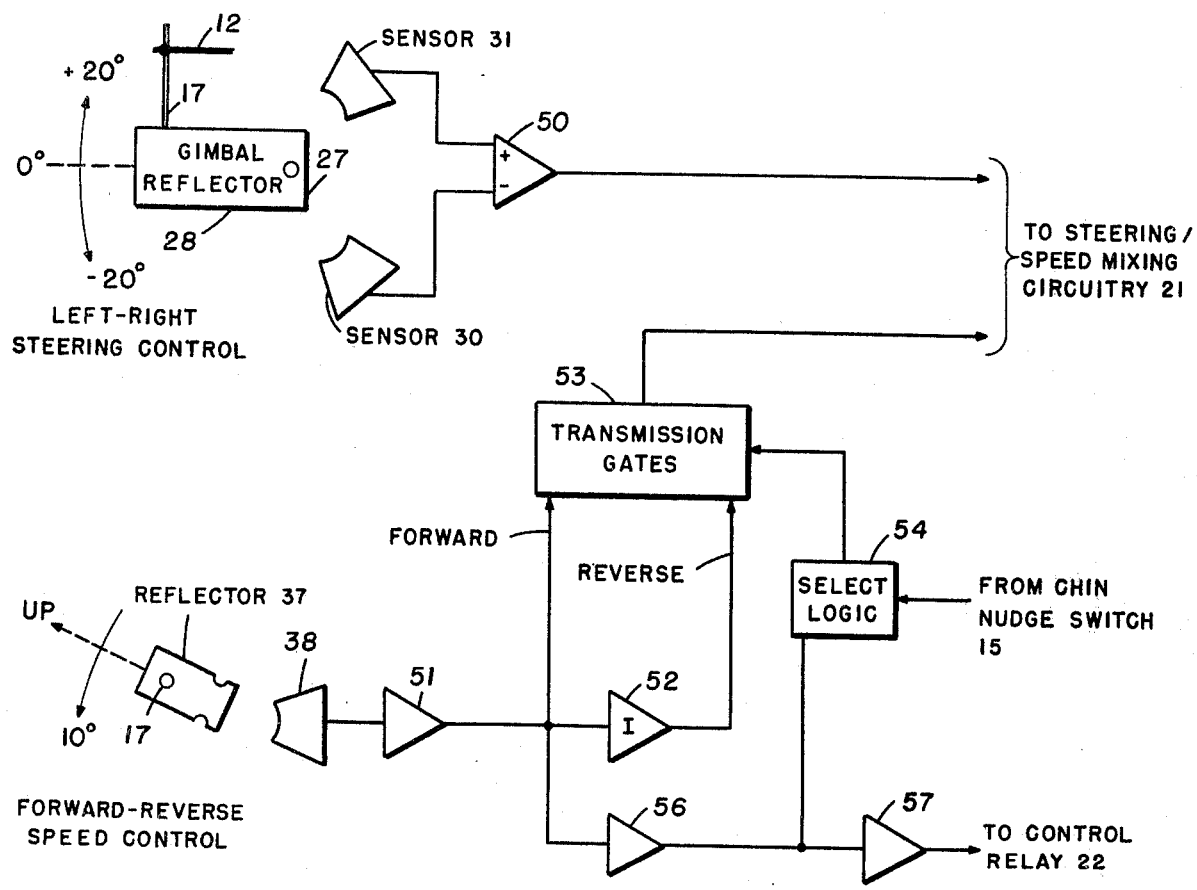
FIG. 4 is a partial block diagram illustrating a preferred manner for detecting user chin control movements and translating such movements into steering/speed /direction of travel control signals for the powered wheelchair, in accordance with the present invention.
Figure 7:
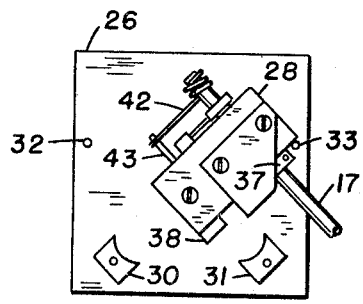
Figure 8:
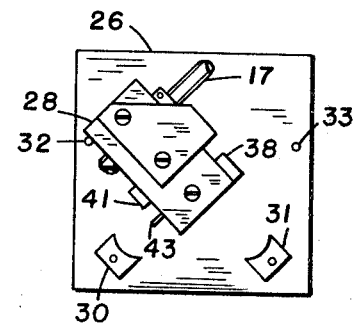

Referring now to FIG. 4, a partial block diagram is illustrated to clarify the manner in which the steering and speed control voltage signals are generated in accordance with the preferred embodiment of the present invention. More particularly, as noted above, the gimbal reflector block 28 is positioned relative to the optical units 30 and 31 so that when the control arm 12 is in its straight ahead steering condition (see FIG. 6), the sensors of units 30 and 31 receive equal amounts of reflected light from the gimbal reflector block 28. Accordingly, in this condition, the plus and minus inputs to the operational amplifier 50 in FIG. 4 are balanced and zero output control voltage is produced, signifying that no left or right steering is being commanded. However, depending upon the amount of pivotal movement of the gimbal reflector block 28 about the shaft 27 as the user moves his chin to the left or right, to select a corresponding amount of turn, the light levels reflected to the sensors 30 and 31 vary proportionately to adjust the input signal levels to the amplifier 50. As a result, the amplifier 50 produces an output voltage whose amplitude and polarity indicates the degree of turn desired and its direction (left or right) relative to the zero degrees or straight ahead position. FIG. 7 of the drawings illustrates the gimbal reflector block 28 in its extreme right turn position wherein minimum light is being sensed at 30 (since the front surface of block 28 is non-reflective) and maximum light is being sensed at 31; whereas, in the opposite, full left turn position (see FIG. 8), minimum light is sensed at 31 and maximum light is sensed at 30.

Figure 9:
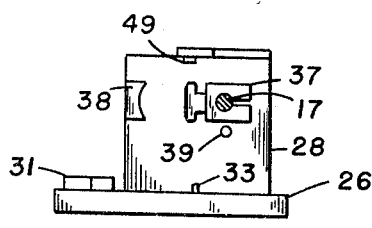
FIG. 9 is a side view of the chin control mechanism, taken along line 9—9 in FIG. 6.

Also shown diagrammatically in FIG. 4 is the manner in which the shaft reflector block 37 rotates with the shaft 17, in accordance with the amount which the user depresses the chin control level 12 to command a particular speed (see also FIG. 9). Thus, the sensor of unit 38 receives an amount of reflected light proportional to the command speed and produces a proportionate control input voltage signal to the operation amplifier 51. The output of the amplifier 51 is of a polarity corresponding to a forward speed control and, after application to inverter 52 corresponds a reverse speed control of equal magnitude. These forward and reverse speed control voltage levels are applied to transmission gates 53 which select whether a forward or reverse speed command voltage signal is to be applied to the wheelchair drive motors, as will be described in detail hereafter.

As mentioned previously, the chin nudge switch 15 is activated by the user in order to select the forward or reverse direction of travel for the wheelchair. This directional control is represented in FIG. 4 by the select logic circuit 54 which responds to actuation of the chin nudge switch and controls the transmission gates 53 so as to couple either a forward or reverse speed control voltage to mixing circuitry (see FIG. 3) where the steering and speed control voltages are mixed together electronically, in order to assure proper correlation between the steering and speed commands, in order to prevent an excessive steering command during maximum forward or reverse speed.

Referring once again to FIG. 4, the output speed command signal from the amplifier 51 is also applied to a threshhold detector circuit 56 which detects whether the speed command is non-zero; i.e. whether the control arm 12 has been depressed from its at rest or zero speed position. The output of the threshold detector 56 is applied to the select logic 54, in order to permit (enable) a change in forward/reverse direction of travel only when the wheelchair is at standstill. The output of the threshold detector 56 is also applied to relay driver 57 which controls the relay 22 (in FIG. 3) whose contacts are connected between the control/interface circuitry of the present invention and the conventional powered wheelchair, such that speed and steering control is rendered ineffective until the user depresses the control arm 12. This provision permits the user to move the control arm 12 out from in front of his face, whenever he wishes, and also assures that faulty operation of the control circuitry will not result in a condition wherein the powered wheelchair is inadvertently placed in a power-on condition with the drive motors energized.

Before beginning a detailed discussion of the preferred control circuitry, shown in FIGS. 11a and 11b, for processing the speed and steering control voltage signals and interfacing them to the wheelchair drive motors, reference is made to a second embodiment of the present invention, shown in FIGS. 12 through 15, wherein the movement of the control arm 12 is detected by potentiometers mechanically linked to the control arm 12. More specifically, as shown in FIG. 12, in this second embodiment, the rearwardly extending end of the control arm 12 is held in a fixture 60, at one end of a rod member 61. The opposite end of rod 61 is connected to a pivot arm 62 which, in turn, is secured to a swivel mounting bracket 63. The bracket 63 carries a housing member 64 containing a potentiometer 65 (see FIG. 14) whose center tap arm 66 is mechanically connected, by spring-loaded plunger 67, to the pivot arm 62. Accordingly, as the control arm 12 is depressed by the user (in proportion to desired speed), the arm 62 pivots about connection 68, against the bias of spring 69 to adjust the position of tap 66 and thereby the pick-off voltage is proportional to control arm depression and therefore the desired speed of the wheelchair. The housing 64 also contains a power on-off switch 70 which is actuated upon depression of the control arm 12; i.e. the switch 70 is functionally related to the control relay 22 illustrated in the block diagram of FIG. 3.

The bracket member 63 is mounted for rotation relative to a mounting base housing 71 by means of a shaft 72 which is affixed to the underside of bracket 63 and which extends through the upper wall of the housing 71 and is journalled at lower wall of the housing. The shaft 72 carries a disc or plate member 73 to which is secured, by bracket 73a, to one end of the movable tap arm 74 for a potentiometer 75 mounted within the housing 71. Accordingly, when the patient moves the control arm 12 left or right, to select steering, the rod 61 is moved back and forward respectively to rotate the bracket 63 on shaft 72. The resultant turning of disc member 73 causes the tap arm of the potentiometer 75 to pick off a voltage which is proportional to left-right or lateral movement of the control arm 12 and therefore the desired degree of turn of the wheelchair. The disc 73 is also formed with an arcuate aperture 76 (see FIG. 13) into which extends a pin 77 secured to the underside of the upper wall of the housing 71, to define permitted limits of movement of the control arm 12 in the lateral or steering plane. A microswitch 78 is also secured to the underside of the top wall of housing 70 and cooperates (by switch roller 78a) with a detent 78b formed on the outer periphery of the disc 73, to demarcate the straight ahead steering position of the control arm 12. The housing 71 is secured to the wheelchair 11 in any suitable manner, by means of a mounting post 79, for example.

As mentioned previously, a detailed schematic diagram for the preferred (optical sensor) embodiment of the proposed chin controller systems is illustrated in FIGS. 11a and 11b. With reference now to FIG. 11a, the speed command sensor unit 38 is comprised of the light-emitting diode (LED) 80 and a light responsive transistor 81 whose output emitter current is dependent upon the amount of light received from the LED and therefore the angular position of the shaft reflector 37 (see FIGS. 4 and 5), in accordance with amount of vertical depression of the chin-operated control arm 12. Thus, the output current from the transistor 81 is proportional to wheelchair speed desired by the user. The output of transistor 81 (appearing across resistor 82) is applied through variable resistor 83 (to adjust the gain for different types of optical sensors) as input to operational amplifier circuitry 51 which, in turn, produces an output signal proportional to the desired speed level.

This output speed control signal is applied, through a low-pass filter formed by resistor 84 and capacitor 85, to the inverter amplifier 52. The low-pass filter 84–85 operates to smooth the speed control signal, in order to help prevent jerky operation of the wheelchair drive motors, for example in the event of bobbing motion of the user's head. The speed control signal from amplifier 51 is also applied to one input of the threshold detector 56, while the other input is derived from the potentiometer 86 which selects a predetermined threshold voltage level, corresponding substantially to zero speed and above which a change in direction of travel is not permitted (disabled) and the control relay 22 (see FIG. 3) becomes energized to apply the speed/steering control signals to the wheelchair drive motors. Thus, the output of the threshold detector 56 is applied to relay driver circuitry 57 which includes a transistor 87 whose collector is connected to the control input (C) of the lowermost of the transmission gates 53, and, along line 88 between FIGS. 11a and 11b, to the winding 89 of the control relay 27. Accordingly, when the transistor 87 is non-conducting, the control input (C) for the lowermost stage G4 of the transmission gates 53 is connected to +12 volts (through the relay winding 89); whereas when the transistor 87 conducts, to energize the control relay 22, the control input (C) for stage G4 of the transmission gates 53 is connected essentially to ground.

The transmission gates designated at 53 comprise four stages G1–G4, each of which includes control input (C), signal input (I) and signal output (O) terminals. Each transmission gate operates to close the connection between its input and output terminals when the associated control input is a positive voltage and to open the input/output connection when the control input is not a positive voltage; i.e. when the control voltage is negative or at ground. As previously noted, the control input (C) for the lowermost transmission gate G4 stage is connected to the collector of the relay driver transistor 87, the output terminal (O) is connected to capacitor 53a; and the input (I) is connected, through the chin nudge switch 15, to the output of a flip-flop circuit comprising operational amplifier 90. The output of operational amplifier 90 is also connected to the control inputs (C) of the two uppermost stages G1 and G2 of the transmission gates 53. As shown in FIG. 11a, the input to the uppermost stage G1 is grounded; whereas, the output terminal is connected to the positive 12 volt supply voltage. The input to the next lower stage G2 of gates 53 is connected to the output of the inverter amplifier 52 (corresponding to reverse speed control) and the output terminal is connected, through resistor 91a and line 91b, as the forward/reverse speed control voltage to the pair of opposite polarity operational amplifier circuits 92 and 93 in (FIG. 11b) which will be described in more detail hereinafter. The output of the remaining transmission gate G3 is also connected to the line 91b and has its input connected to the output of the amplifier 51 (corresponding to forward speed control); whereas, the control input to this gate stage is connected to the plus 12 volt supply.

The flip-flop circuitry including amplifier 90, together with the stage G4 of the transmission gates 53, functions as the select logic 54 (see FIG. 4) to determine the direction of travel of the wheelchair, in response to actuation of the chin nudge switch 15. More specifically, when the master on-off switch 24 is initially turned on, the application of the 6 volt supply to the operational amplifier 90 causes its output to become minus, corresponding to selection of the forward direction of travel. Inasmuch as the control input to the lowermost stage G4 of the transmission gates 53 is at 12 volts, the capacitor 53a is connected to the negative output of the operational amplifier 90. If the user were to now operate the chin nudge switch 15 to close its lower contact in FIG. 11a, the negative voltage of the capacitor 53a would be applied to the negative input of the operational amplifier 90, thus causing the output of 90 to go positive. This positive output (corresponding to the reverse direction), when applied as the control input to the upper two sections G1 and G2 of the gates 53, grounds the control input for stage G3 (forward speed signal) through stage G1 of the gates 53 and opens the stage G2 (reverse speed signal) to apply the output of the inverter amplifier 52 to the speed control signal line 91b. As will be described in more detail hereinafter, this would cause rotation of the drive motors in the proper directions to produce reverse movement of the wheelchair.

It will be noted that when the chin nudge switch is released (its upper contact closed in FIG. 11a), the positive output of the operational amplifier 90 is connected to and charges the capacitor 53a through gate stage G4. Accordingly, when the chin nudge switch 15 is again operated (to close is lower contact), the negative input terminal to the operational amplifier 90 will be connected to a positive polarity signal, thus causing the output of the amplifier 90 to go negative and thereby opening the upper two sections G1 and G2 of the gates 53 and closing the section G3 so as to connect the output voltage of the amplifier 51 (forward speed) to the control signal line 91b.

In the foregoing discussion, it has been assumed that the switch 15 is a mechanical switch operated or nudged forward by the user's chin. It should, however, be understood at this time that the switch 15 may take any suitable form, such as a switching circuit which includes a thermistor which is momentarily cooled by the user blowing air thereover and which is connected to activate conventional switch triggering circuitry, to indicate that a change in direction of travel (forward or reverse) is desired by the user.

As previously noted, the output voltage from the operational amplifier stage 51 or 52 is proportional to the desired speed level selected by the user depressing the chin control arm 12, as detected by the optical sensor 34, and appears on the control line 91b leading to the output operational amplifier pair 92-93 in FIG. 11b. The output operational amplifiers 92-93 are poled oppositely inasmuch as, for a given direction of travel of the wheelchair, the motors on opposite sides must rotate in opposite directions. Thus, the relative polarity of the control voltage across the motor input windings determines the direction of motor rotation and motor speed is varied linearly with the voltage amplitude across each motor input.

As previously described, the optical sensor units 30 and 31 detect the lateral or steering position of control lever 12, depending upon the amount of lateral movement of the user's chin. Thus, in FIG. 11a, the outputs of sensor transistors 94 and 95 contained in the optical units 30 and 31 are applied as the two inputs to a difference amplifier 50 which substracts one input from the other and produces a corresponding difference voltage signal output. This signal is, in turn, applied to an operational amplifier circuit 96 whose feedback resistance is selectable in accordance with the position of relay 97. As will be described shortly, the relay 97 is operated in accordance with the desired torque level for the wheelchair drive. The steering control voltage output from the operational amplifier circuit 96 is applied, along line 98 between FIGS. 11a and 11b, as the second input to each of the output operational amplifiers 92-93. Thus, at the operational amplifier circuits 92-93, the steering and speed control voltages are mixed together (by subtracting one from the other), so that when a relatively large speed control voltage signal is being commanded, it would offset (reduce) any large steering control signal simultaneously commanded and vice versa; i.e. care is taken to avoid the simultaneous request of large turning and speed commands which could inadvertently cause dangerous operation of the powered wheelchair.

The value of the feedback resistor in the operational amplifier circuit 96 is controlled by the position of the torque switch 41 (see FIGS. 5 and 11a). Thus, when the patient lifts up on the control arm 12 to cause the shaft lever 40 to operate the torque switch 41, the associated relay 99 shown in FIG. 11a is energized from the charged condenser 100 which is illustrated as forming part of the torque switch unit 41. When this occurs, the relay winding 97 is energized from the 12 volt supply, through the Zener diode 101, to operate its armature and connect a preselected different resistor value in the feedback circuit for amplifier 96 in order to affect a change in the amplifier gain corresponding to the desired change in the drive torque level. For example, the operation of the relay 97 might be used to switch the wheelchair system from high to low torque operation when operating the wheelchair on hills.

The gain of the output operational amplifier circuits 92-93 in FIG. 11b is also made adjustable, in accordance with the preferred embodiment of the present invention, by AGC circuitry comprising operational amplifier 102 (see FIG. 11a) and a transistor circuit 103. More specifically, connected in series in the collector circuit of the transistor 103 are a pair of conventional optical isolator units 104 and 105, each comprising an LED and a photoresistor element whose resistance value varies in accordance with the light emitted by the LED and thus the conduction current of the transistor 103. These variable resistance elements formed by the optical isolators 104 and 105 are connected in parallel across the feedback circuits of output operational amplifiers 92 and 93, respectively. As shown in FIG. 11a, the input to the AGC amplifier 102 is the speed control voltage signal appearing at the output of the inverter amplifier 52. Thus, the conduction current of transistor 103 is proportional to the speed control level desired by the user, such that an increase in the desired speed control level increases the current in transistor 103 correspondingly and increases also the resistance value represented by the optical isolators 104 and 105. As a result, the feedback resistance value across the output amplifiers 92 and 93 increases, to increase the output gain proportionally with the speed command level; i.e. as more speed is commanded, the gain of the output operational amplifiers 92 and 93 increase proportionately.

The purpose of this AGC circuitry is to prevent undesirable large acceleration of the wheelchair in the event the occupant commands a sharp turn and then begins depressing the control arm 12 for forward-/reverse speed. In other words, without this AGC circuitry, if a maximum turn, minimum speed command situation were to exist, the full turn control signals would be applied to the wheelchair drive motors, with minimal speed control signal to offset the turn command, at amplifiers 92 and 93, as previously discussed.

Within the AGC circuitry proposed in accordance with the present invention, with zero speed being commanded (e.g. at the output of inverter 52), conduction current of transistor 103 is at saturation and therefore the photorisistors 104/105 have a preselected minimum resistance value. As a result, the gain of the output operational amplifiers 92/93 is reduced to a level where the drive motors will not rotate. Conversely, when the speed command is increased, the transistor 103 responds by decreasing its conduction current accordingly, and the resistance value of the photoresistors 104/105 increases proportionately to increase the gain of the operational amplifiers 92/93 and thereby increase the response by the drive motors to the speed/steering control signals. At full speed command (control arm 12 fully depressed), the feedback resistance represented by the photoresistors 104/105 are substantially greater in value than the fixed feedback resistors for the output op-amps 92/93 (see FIG. 11b) and the gain of these op-amps therefore becomes essentially a constant value.

In accordance with the preferred embodiment of the present invention, the control circuitry shown in FIGS. 11a and 11b includes provision for an audible horn unit 105 (see FIG. 11b) which is sounded to provide audio signal to the user under certain conditions. For example, when the supply batteries for the wheelchair are detected in a low voltage condition, by the operational amplifier circuit 106 connected to respond to the battery voltage level through the potentiometer 107, the horn drive transistor 108 is rendered conductive, to apply an energizing current to the horn unit 105. Similarly, when the user selects low torque level operation, as previously described, the resulting energization of the relay 99 from the charged capacitor 100 (in switch unit 41) produces a momentary voltage pulse at the base of the transistor 109. Transistor 109 responds by applying a single distinctive pulse to energize the horn 105, over line 110 between FIGS. 11a and 11b. This provides a distinctive audible indication to the user that low torque operation of the drive control circuitry is operative. Finally, when the operational amplifier 90 in FIG. 11a, forming the direction control flip/flop circuitry, switches to an operating state corresponding to the reverse direction of travel condition, its output voltage level becomes positive. This positive voltage appears on line 111, between FIGS. 11a and 11b, and produces conduction of transistor 112a which is connected in a low frequency oscillator configuration as shown in 11b. Thus, whenever reverse direction of travel is selected by the user, the oscillator circuitry 112 is activated to produce a distinctive low-frequency continuous pulsing of the horn 105 which persists as long as the powered wheelchair is in its reverse direction of travel condition.

Various modifications, adaptations and alternations to the present invention are of course possible in light of the above teachings, in addition to those set forth specifically. It should therefore be understood at this time that within the scope of the appended claims the invention may be practiced otherwise than as specifically described hereinabove.

What is claimed is:

1. An improved controller system for enabling a person with limited mobility to control, by chin movements, the drive motor means of a powered wheelchair or the like in order to control the speed and steering of the wheelchair, said improved chin controller system comprising, in combination:

a control arm having one end mounted adjacent the rear of the wheelchair for pivotal movement in both horizontal and vertical directions and having its opposite end extending to a location adjacent the chin of a person occupying the wheelchair, the extending end of said control arm supporting a low profile actuator means engageable by the person's chin, enabling the person to depress the control arm vertically and simultaneously swing said control arm sideways by turning the person's head, and drive motor control means responsive to the chin-activated movements of said control arm and operably connected to the drive motor means for controlling the speed of the wheelchair to vary in proportion to the vertical depression of said control arm and the left-right steering of the wheelchair to vary in proportion to the amount said control arm is swung sideways to the left or right respectively.

2. The improved chin controller system specified in claim 1 further comprising:

switch means supported on the extending end of said control arm operable by the person to select forward or reverse direction of travel for the wheelchair, said drive motor control means being responsive to said switch means to selectively control the direction of rotation of said drive motor means.

3. The improvement specified in claim 1 wherein said control arm is mounted adjacent the rear of the wheelchair for pivotal motion about two perpendicular axes;

the first axis being vertical and the control arm moving in a horizontal plane about said vertical axis in proportion to sideways movements of the person's chin; and the second axis being horizontal and the control arm moving in a vertical plane about said horizontal axis in proportion to vertical movement of the person's chin, the length of the control arm between the person's chin and pivotal axes being preselected to cause control motions of the person's chin to be readily detectable pivotal movements of said control arm about each of said axes.

4. The improvement specified in claim 2 wherein said switch means supported on said control arm is operated by a forward movement of the person's chin to select between forward and reverse directions of travel.

5. The improvement specified in claim 2 wherein said switch means comprises switching circuitry including a microswitch actuatable by the person's chin for alternately selecting between forward and reverse directions of travel upon successive actuations of said microswitch.

6. The improvement specified in claim 3 wherein said drive motor control means includes optical means for detecting pivotal movement of said control arm about said first and second axes and producing speed and steering control signals for said drive motor means.

7. The improvements as specified in claim 3 wherein said drive motor control means includes potentiometer means having control taps connected mechanically to said control arm to detect the pivotal movements of control arm about said first and second axes.

8. The improvement specified in claim 1 wherein said wheelchair is of the type having a separate drive motor for the wheel on each side of the wheelchair, and wherein said drive motor control means includes means responsive to movements of said control arm for converting said movements into corresponding electrical speed and steering control signals for controlling separately the direction and speed of rotation of each wheelchair drive motor.

9. The improvement specified in claim 8 wherein said motor control means includes circuit means having a switch means actuable by the person occupying the wheelchair for selectively controlling the direction of rotation of the wheelchair drive motor means to cause the wheelchair to travel in either a forward or reverse direction, as desired by the person.

10. The improvement specified in claim 2 further comprising interlock means for enabling a change in the direction of travel only when the wheelchair is at standstill.

11. The improvement specified in claim 8 further including circuit means for receiving and combining said speed and steering control signals to correlate the speed of said wheelchair with the wheelchair steering command in order to assure smooth turns of the wheelchair.

12. The improvements specified in claim 1 wherein said drive motor control means includes means operable by the person for selecting between first and second drive torque levels.

13. The improvement specified in claim 1 including means responsive to the non-depressed vertical position of said control arm for enabling said control arm to be swung sideways without producing a steering control signal applied to said wheelchair drive motors.

14. The improvement specified in claim 13 wherein said enabling means comprises,
a relay means having contacts connected to apply a steering control signal to said drive motor only when said relay means is energized, and
circuit means responsive to the position of said control arm for energizing said relay means only when said control arm is in a position corresponding to zero desired speed.

15. The improvement specified in claim 1 further comprising means for biasing said control arm vertically upward towards a position corresponding to zero desired speed.

16. The improvement specified in claim 3 further comprising:
a control arm mounting means secured relative to said wheelchair adjacent the rear thereof,
said mounting means being pivotable about a first vertical axis and about a second horizontal axes,
said control arm being connected at one end mechanically to said mounting means to pivot said mounting means simultaneously about said vertical and horizontal axes as the extending opposite end of said control arm is swung sideways and depressed respectively by the person occupying the wheelchair,
said drive motor control means including detector means for detecting the pivotal movements of said mounting means about said vertical and horizontal axes and producing proportionate control signals for said drive motor means corresponding to the desired steering direction and speed level respectively for said wheelchair.

17. The improvement specified in claim 16 wherein:
said detector means comprises first and second optical means each including an optical source for generating output light and an optical sensor for producing a signal proportionate to the amount of output light reflected from a nearby object, and
said control arm mounting means comprises a first member having an optically reflective surface whose angular position relative to said first optical means varies as said mounting means pivots about said vertical axis and a second member having an optically reflective surface whose angular position relative to said second optical means varies as said mounting means pivots about said horizontal axis,
whereby said first optical means produces a first output signal proportionate to the desired steering direction for the wheelchair relative to a predetermined reference direction and whereby said second optical means produces a second output signal proportionate to the desired wheelchair speed level.

18. The improvement specified in claim 17 further including detent means for indexing said mounting means in said predetermined reference direction.

19. The improvement specified in claim 11 wherein said circuit means comprises operational amplifier circuitry for subtracting the speed and steering control signals from one another to produce a difference signal for application to the drive motors, and further including gain control means responsive to the command positioning of said control arm for varying the gain of said operational amplifier circuitry in accordance with the desired wheelchair speed level, whereby excessive acceleration of said wheelchair is avoided when the person occupying the wheelchair swings the control arm to an extreme sideways position to command a maximum turn and subsequently depresses said control arm to command a desired speed level.

20. The improvement specified in claim 17 wherein said first member of the control arm mounting means is a block member having a first optically reflective surface thereon pivotable about a vertical axis in response to sideways movement of said control arm, wherein said second member of the control arm mounting means is a rotatable horizontal shaft member having a second optically reflective surface thereon, said shaft member being affixed to said block member and being connected to be rotated about its horizontal longitudinal axis in response to vertical movement of said control arm, wherein said first optical means is positioned to detect the angular position of said first optically reflective surface as said block member pivots, and wherein said second optical member is positioned to detect the angular position of said second optically reflective surface as said shaft member rotates.

21. The improvement specified in claim 20 further including spring biasing means connected to said shaft member for biasing said shaft member in direction of rotation opposite to the direction in which said shaft member is rotated in response to vertical depression of said control arm, whereby said control arm is biased upwardly towards a position corresponding to zero desired speed for the wheelchair.

22. The improvement specified in claim 21 further including a microswitch mounted on said block member and a switch actuator arm member affixed to said horizontal shaft member, said arm member being positioned to actuate said microswitch when said shaft member is rotated to a position corresponding to upward lifting of the control arm by the person occupying the wheelchair, said microswitch being interconnected in said drive motor control means to select between first and second drive torque levels.

23. The improvement specified in claim 22 further comprising means for defining mechanical stop limits for the pivotal motion of said block member about said vertical axis and for the rotation of said shaft member about its horizontal longitudinal axis.

24. An improved controller system for enabling a person with limited mobility to control, by movements of a selected body portion, the drive motor means of a powered wheelchair or the like in order to control the speed and steering of the wheelchair, said improved controller system comprising, in combination:
   a control arm having one end mounted for pivotal movement in both horizontal and vertical directions and having its opposite end extending to a location engageable by the selected body portion of a person occupying the wheelchair,
   the extending end of said control arm being simultaneously depressable vertically and swingable horizontally from side to side by the movements of said body portion, and
   drive motor control means responsive to the vertical and horizontal movements of said control arm and operably connected to the drive motor means for controlling the speed of the wheelchair to vary in proportion to the vertical depression of said control arm and the left-right steering of the wheelchair to vary in proportion to the amount said control arm is swung sideways relative to a predetermined center position,
   said drive motor control means comprising optical means for detecting pivotal movement of said control arm in both vertical and horizontal direction and producing speed and steering control signals in proportion thereto respectively for said drive motor means.

25. The improved controller specified in claim 24 wherein said optical means comprises:
   first optical detector means responsive to vertical depression of said control arm for producing a proportionate speed command signal for said drive motor means, and
   second optical detector means responsive to horizontal movement of said control arm sideways to the left or right of said predetermined center position for producing a proportionate left or right steering command signal for said drive motor means.

26. The improved controller specified in claim 24 including indexing means for enabling the person to recognize when the control arm is in said predetermined center position corresponding to straight ahead steering.

27. The improved controller specified in claim 26 further including means for biasing said control arm upwardly into its non-depressed zero speed position.

28. The improved controller specified in claim 25 further including signal processing means responsive to said speed and steering command signals for preventing the simultaneous commanding of a high speed and a sharp turn of said wheelchair.

29. The improved controller specified in claim 28 wherein said signal processing means further includes means responsive to said speed command signal for adjusting said steering command signal to limit acceleration of the wheelchair during sharp turns.

* * * * *